United States Patent [19]
Canary

[11] Patent Number: 5,204,173
[45] Date of Patent: Apr. 20, 1993

[54] PAPERBOARD PRODUCT AND PROCESS

[75] Inventor: Stephen A. Canary, Westfield, Mass.

[73] Assignee: DVSG Holding GmbH, Frankfurt am Main, Fed. Rep. of Germany

[21] Appl. No.: 621,083

[22] Filed: Nov. 29, 1990

[51] Int. Cl.$^5$ .................... A43B 13/38; D03D 25/00; D21F 13/00

[52] U.S. Cl. .................... 428/284; 428/513; 428/282; 428/288; 428/296; 428/218; 428/298; 428/303; 162/129; 162/130; 162/132; 162/146; 36/43; 36/44

[58] Field of Search .................... 428/284; 36/43, 44; 162/129, 130, 132, 146

[56] References Cited

U.S. PATENT DOCUMENTS

| | | | |
|---|---|---|---|
| 4,212,703 | 7/1980 | D'Amico et al. | 162/129 |
| 4,864,740 | 9/1989 | Oakley | 36/44 |
| 4,882,213 | 11/1989 | Gaddis et al. | 428/171 |

Primary Examiner—George F. Lesmes
Assistant Examiner—K. Shelborne

[57] ABSTRACT

A laminated paperboard product and a process for making the product and shoe insoles made therefrom. The product is formed of a first layer with a mixture of a predominance of a polyolefin fibers (preferably polyethylene) that has been treated to make it hydrophilic and long fiber softwood pulp, and a second layer formed of a mixture of the polyolefin fiber (again preferably polyethylene) and a predominance long fiber softwood pulp.

When made into shoe insoles, the product has a second ply formed of a third and a fourth layer. The third layer has a composition that is similar to the second layer in that the quantity of polyolefin is greater then the quantity of wood pulp and the fourth layer has a composition that is similar to the first layer in that the quantity of polyolefin is less then the quantity of wood pulp.

The layers of the product are bonded together by melting the polyolefin of one layer into the polyolefin and the fiber matrix of an adjacent layer, each of the layers being disposed on each other, the first layer forming one side and the fourth layer forming an obverse side and the second and third layers being disposed therebetween.

21 Claims, 3 Drawing Sheets

PAPERBOARD PRODUCT AND PROCESS

The present invention relates to paperboard products formed of polyolefins and wood fiber which can be die-cut into insoles for shoes. The product is especially useful for automated die-cutting processes for making insoles with two or more different characteristics.

Summary of the Invention

In accordance with the present invention, I have discovered a paperboard product formed of a ply having at least two layers, one of which is formed of a furnish of a hydrophilic polyolefin fiber and a long fiber softwood pulp wherein the quantity of polyolefin is greater than the quantity of wood pulp and the other of which serves as a base for the first mentioned layer and is also formed of a furnish of hydrophilic polyolefin fiber and long fiber softwood pulp. In the case of the other layer, however, the quantity of polyolefin fiber is less than the quantity of the wood pulp. Additional conventional paper making materials such as bonding agents, retention aids, and synthetic staple fibers can be added to the furnishes of each of the layers as desired, as can conventional fillers such as clay and talc, all of these additional materials being in conventional quantities.

To manufacture the paperboard product of the present invention, one of the layers is "wet-laid" according to conventional paper making techniques using conventional Fourdrinier equipment and then the second layer is laid upon the first layer. The product is drained and water is removed according to the conventional techniques using vacuum and heating to predetermined temperatures. The resulting product has between about 0 and 8% by weight water, as is predetermined by the paperboard manufacturer. The resulting ply can be turned into rolls and stored in that form.

Moreover, I have discovered that by placing the two plies in partially overlapping relationship with one another with the plies thereof containing the higher level of polyolefin being in surface contact with each other and then compressing them together to consolidate and bond them by melting the polyolefin of the layers so that it merges and flows into the interstices of the fibers, a two-ply product is attained that has different physical characteristics in one area than in another, although the thickness of the product is substantially uniform throughout.

When used in shoe making, the shoe manufacturer laminates two of the plies together although the manufacturer of the paperboard product can provide the lamination also. The two plies are preferably identical to each other. The two-ply product thus obtained is especially useful in the manufacture of shoe insoles, firstly in that it allows for a continuous feed for the cutting and fabrication of the insoles, and further in that the density varies in different areas thereby providing a unitary product of substantially uniform thickness but with different properties, such as flexibility, stiffness and moldability in the different areas.

Currently, insoles for shoes wherein different characteristics are needed along the length of the product, are formed by laminating paperboards of different characteristics or joining leather and paperboard together. In order to avoid lumps in such laminations, it is common to skive the ends of the different components prior to gluing or otherwise laminating them together to form a composite sheet that can be die-cut. With the two-ply paperboard of the present invention on the other hand, tedious steps such as skiving and joining can be eliminated.

As already mentioned, in the manufacture of the two-ply material, the two plies are placed in partial overlapping relationship with each other (with the high-polyolefin sides in surface contact) and the plies are disposed between heated surfaces for a short period at pressures between about 400 and 600 psi. and at temperatures between about 300° and 320° F. It is necessary to use temperatures that are below the degradation temperature of the cellulose in the wood pulp but above the melting point of the polyolefin while still being high enough to provide a relatively rapid heat transfer from the heat source into the body of the plies being made. Such heating causes the polyolefin to soften and melt so that the polyolefin of the layers melt and merge and flow into the fiber matrix whereby to form the final die-cuttable product.

Insoles of a unitary construction as herein described when used in the manufacture of shoes may be shaped by heat into any desired configuration while still providing rigidity where desired and flexibility as necessary. For example, insoles made of the two-ply material of the present invention can be heated and then molded to configurations that can vary between the relatively flat shape of a man's shoe to the high instep of a woman's shoe. At the same time, such insoles by reason of the different characteristics they present in different areas, can provide an area of the insole that is flexible (e.g. the forepart region) while another area is more rigid (e.g. the heel and shank regions). Moreover, additional flexibility, especially useful in high-heeled women's shoes, can be provided by forming grooves in the underside of the forepart of the insole so as to provide a sort of hinge which enables the insole to be bent more readily. Such grooves are conventionally formed by localized heating and compression.

The paperboard product of the present invention may also be used so as to provide a relatively rigid paperboard, suitable for use as, e.g. a lightweight shankboard for shoes. Such a shankboard would then be laminated with a conventional paperboard or non-woven insole forepart to form the complete insole. To produce such a shankboard, two plies of the paperboard product are placed in complete overlapping relationship, with the high-level polyolefin layers in surface contact and by heating and compression formed into a two-ply sheet material which can then be die-cut in a conventional manner. Prior to such die cutting of the sheets, such two-ply material will usually be edge-skived and bonded to similarly prepared conventional paperboard or non-woven material suitable for the insole forepart portion. In some cases, however, the shankboard will be separately die-cut and thereafter, usually following insertion of a metal shank, will be laminated to a die-cut paperboard or nonwoven component which extends not only in the forepart but also over the whole of the surface of the shankboard.

DESCRIPTION OF THE PREFERRED EMBODIMENT

Figure 1:
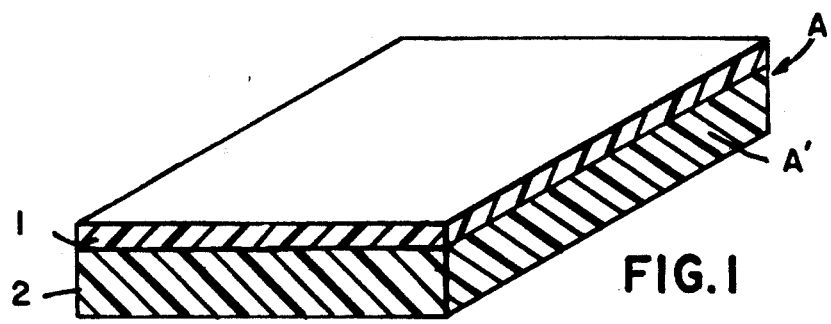
FIG. 1 is a perspective view, partially in cross section, showing a laminated ply of paperboard product according to the present invention.

As shown in FIG. 1, a paperboard product according to the present invention comprises a laminated ply which consists of two layers 1 and 2. Layer 1 has a density of between about 0.4 and 0.5 g/cm$^3$ and a thickness between about 0.01 and 0.05 in. Layer 2 is disposed beneath layer 1 and differs from layer 1 principally in that it contains a greater ratio of polyolefin to wood fibers. Layer 2 has a density between about 0.4 and 0.5 g/cm$^3$ and a thickness between about 0.07 and 0.12 in. The two layers 1 and 2 are joined together at an interface A' by both the intermixing of the wood fibers and also by the partial softening of the polyolefin fibers. Layer 1 forms between about 10 to 20% of the thickness of the ply and layer 2 constitutes the balance.

Layer 1 generally has between about 10 and 40 wt. % polyolefin fibers that have been rendered hydrophilic by a coating with polypropylene. This layer is referred to as a "low polyolefin" layer and preferably, between about 20 and 40 wt. % polyolefin is used. Preferably the polyolefin fiber used is a coated polyethylene that is easily dispersed in water. The fibrils of the polyethylene have an average length between about 0.6 and 1.2 mm. and a maximum length of about 2.5 mm. Layer 1 also contains a softwood pulp that has fibers with an average length between about 2 and 5 mm. Layer 2 generally has between about 40 and 80 wt. % polyolefin and preferably between about 55 and 65 wt. % and is referred to herein as the "high polyolefin" layer. In some cases, it may be desirable to reduce the brittleness of the product by adding up to about 10 wt. % polypropylene to the mixtures that are used to form the layers.

Figure 2:
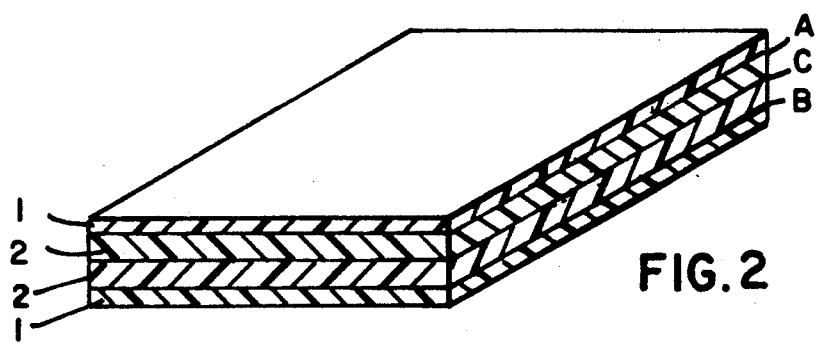
FIG. 2 is a perspective view, partially in cross-section, showing two plies of the laminated construction of the paperboard product consolidated with each other.

FIG. 2 shows the product which comprises two plies A and B joined together at an interface C. The two-ply product is formed by passing the plies A and B between heated surfaces such as platens at predetermined temperatures and pressures so that they will join together. It will be observed that the high polyolefin layers 2 are in surface contact with each other and these layers and thus the plies are fixedly bonded together by intermelting the polyolefins in each of these layers. The low polyolefin layers 1 thus form the obverse side of the two-ply product. Such a two-ply product is useful in shoe shankboards, as will be referred to hereinafter with reference to FIG. 6.

It is also possible using the two-ply materials to attain variations in density and moldability of the products in different areas. For example, one area of the product can have a density between about 0.4 and 0.5 gm./cm$^3$ and another area can have a density between about 0.8 and 0.95 gm./cm$^3$.

Figure 3A:
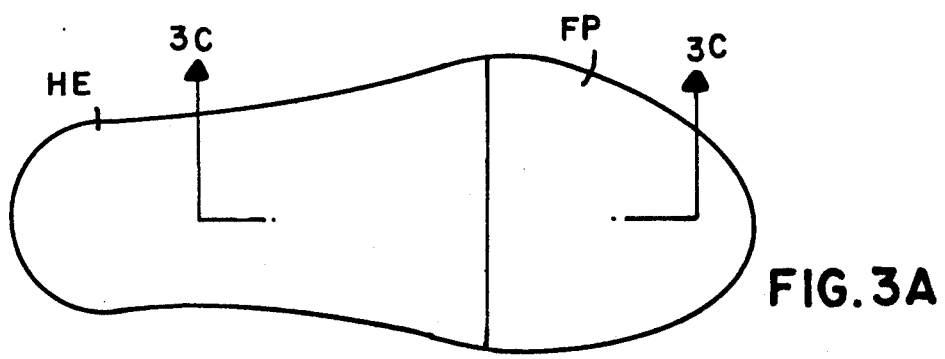
FIG. 3A is a top plan view of an insole formed of a paperboard-polyolefin product, according to the present invention.
Figure 3B:
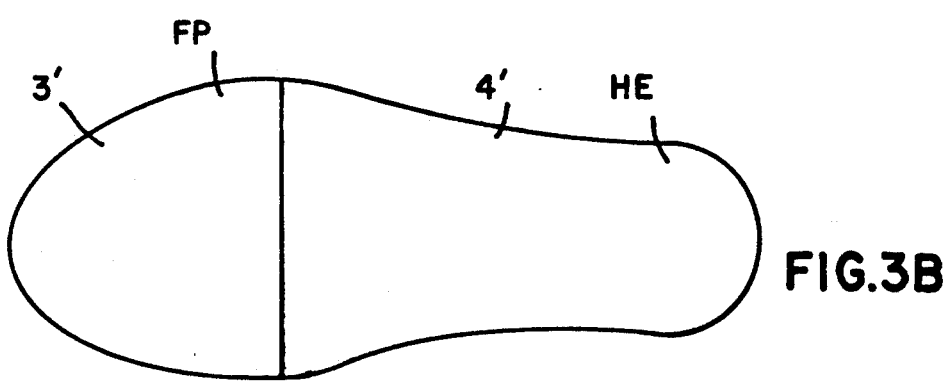
FIG. 3B is a view of the obverse side of the insole shown in FIG. 3A.

FIGS. 3A and 3B show an insole that has been die-cut from a two-ply material incorporating the paperboard product of the present invention wherein the plies are arranged in only partially overlapping relationship, with the high polyolefin layers 1 in surface contact as illustrated in FIGS. 3C, 4, 5A and 5B.

Figure 5A:
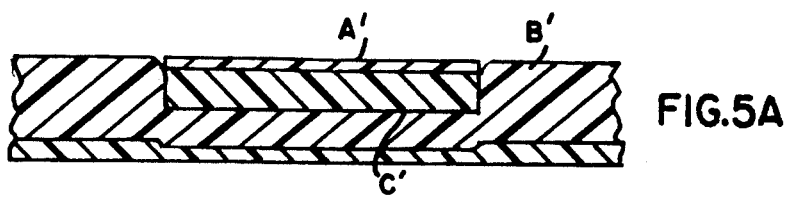
FIG. 5A is a cross-sectional view of an embodiment of the present invention taken along the lines 5A—5A of FIG. 5B and illustrating a two-ply material wherein the two plies are in partial overlap with one another. This embodiment is especially useful in the production of die-cut shoe insoles that have more than one physical characteristic.
Figure 5B:
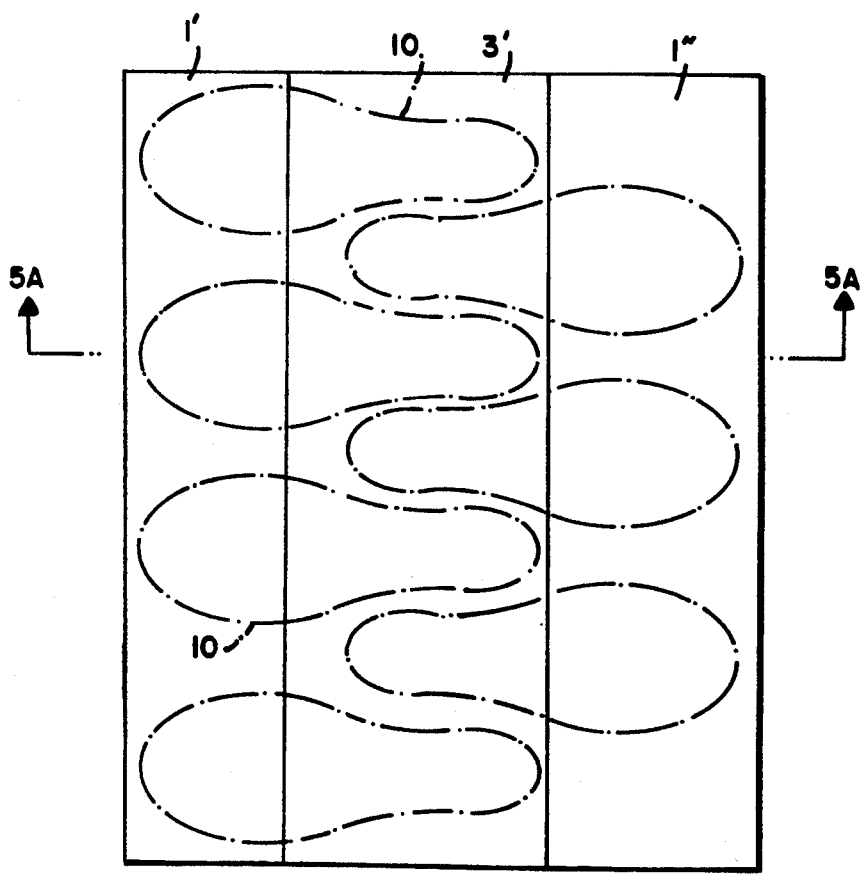
FIG. 5B is a top plan view of the two-ply product shown in FIG. 5A.

As shown in FIGS. 5A and 5B, a first ply A' which is narrow in comparison with a second ply B' is laid centrally over the ply B' and the plies are joined together at an interface C', the plies being compressed during such joining so that the product has a substantially uniform thickness across its entire width. As a result, the central area of the two ply product has a significantly higher density then that of the outside regions.

As can be seen in FIG. 5B, the two-ply product of FIG. 5A can be die-cut (as shown by dotted lines 10) with the cutting die disposed so as to cut across the overlap of the plies A' and B'. The die-cuts are staggered alternately between the left and right side of the two ply material thereby ensuring maximum utilization of the high cost central region, and thus minimizing cutting costs and waste. In this way moreover, unitary insoles can be formed having a heel seat and shank region made from the more rigid central region of the two-ply material and the forepart made from the relatively flexible region thereof, while the thickness of the insole remains substantially constant along its length.

Figure 3C:
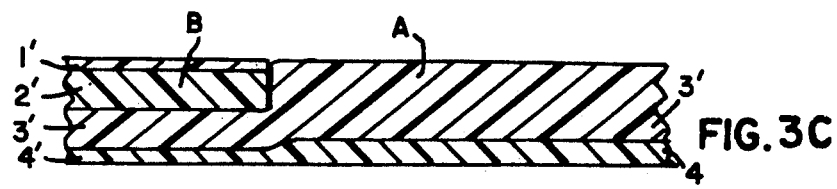
FIG. 3C is a cross-sectional view of the insole, according to the present invention taken along the lines 3C—3C of FIG. 3A illustrating the construction of the two-ply material.
Figure 4:
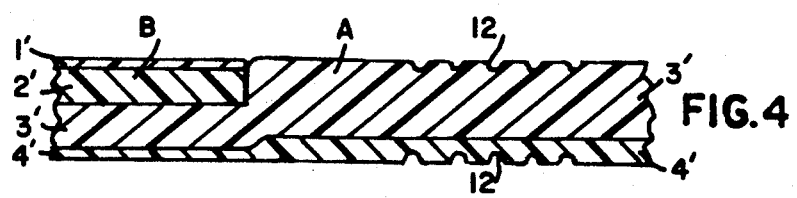
FIG. 4 is a cross-sectional view, similar to the cross-sectional view of FIG. 3C in which a portion of the obverse side of the insole is grooved to allow for greater flexibility.

FIG. 3C shows a similar material to that of FIG. 5A but in this case the ply B is narrower so that ply A covers one side thereof; that is to say ply B extends to only one side of ply A, thereby again providing different physical characteristics in different areas of insoles cut therefrom where such cuts extend across the overlap. In FIG. 4, the same construction as FIG. 3C is shown, except that the layer 4' has been grooved (as indicated at 12) to provide a sort of hinge affording additional flexibility in the ball region of insoles cut therefrom. Such grooving can be achieved by localized heating and compression.

Figure 6:
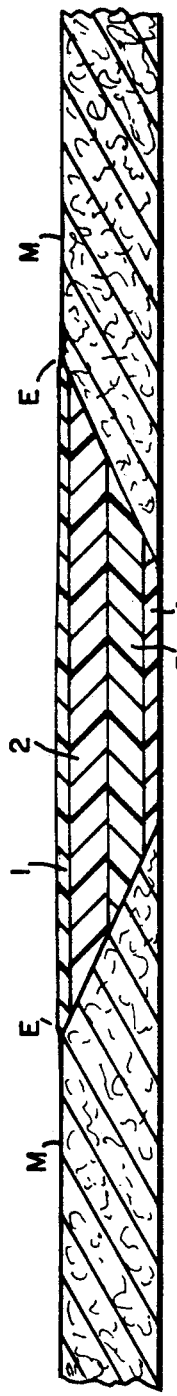
FIG. 6 is a cross-sectional view of another embodiment of the present invention in which a two-ply material in accordance with the invention is used in conjunction with a conventional paperboard or non-woven insole material, the plies being arranged similarly to those shown in FIG. 5B.

FIG. 6 illustrates a further use of the material shown in FIG. 2. In this case the material is used for the shankboard of insoles, the forepart of which is provided by conventional paperboard or non-woven insole material M. The two ply material and the paperboard or non-woven material are joined together in a conventional manner, namely by being skived so as to provide a wide surface for adhesion and to reduce the thickness at the joint therebetween. Preferably, adhesion is enhanced with a hot melt adhesive. It will be noted that the two ply material is again arranged centrally of the other material and cutting is effected similarly to the process illustrated in FIG. 5B.

Figure 7:
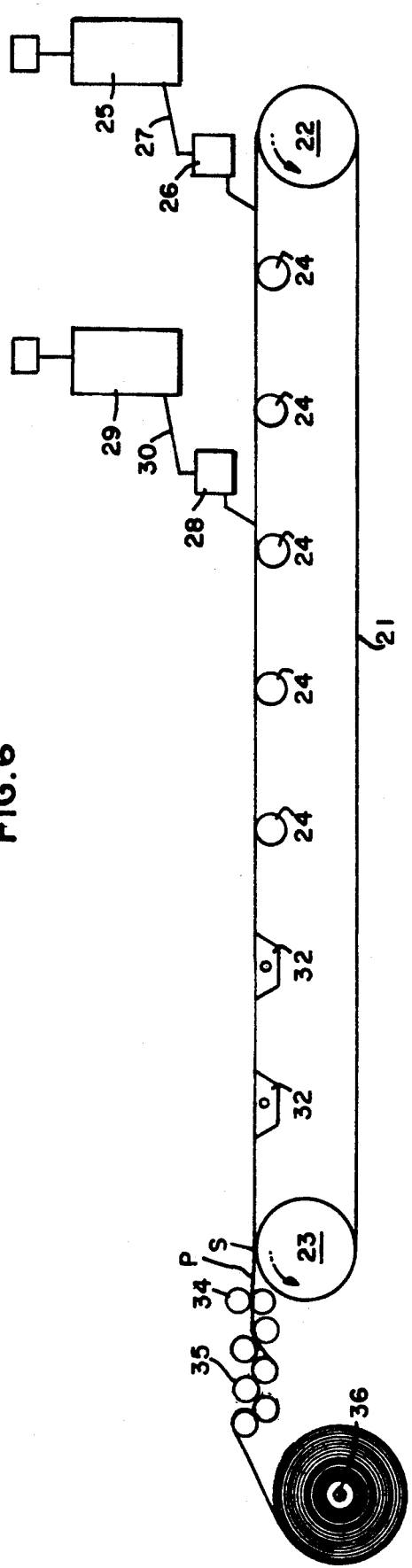
FIG. 7 is a side elevational view of equipment that can be used to produce the paperboard product according to the present invention.

Referring now to FIG. 7, a conventional Fourdrinier machine is shown that is used for making paperboard according to conventional wet-laid paper making techniques. A conventional wire screen is disposed between two rotating drums 22 and 23, as is conventional in the art. Wire 21 rolls over rollers 24 which remove water from the wet-laid paper. A mixture of hydrophilic polyolefin and long fiber softwood pulp together with other common paper making ingredients are mixed in tank 25 and carried to headbox 26 through pipe 27 to form the inner layer of the paperboard product (that is the one that has the higher polyolefin content). From headbox 26, the mixture flows onto the wire 21 as is conventional in the art. Water is removed as the wire and the wet-laid paper passes over the rollers 24 as a continuous sheet of material. As the wet-laid material passes beneath a second headbox 28 (that is supplied from a second tank 29 through pipe 30) a second layer is deposited upon it. The ply that is formed passes further along on the Fourdrinier over additional rollers 24 and finally passes over a suction area 32 in which a predetermined quantity of water is removed from the paperboard. The ply of paperboard is then separated from the wire 21 at point S. After separation, the ply is passed between a pair of wet press rollers 34 to squeeze out such additional water as is desired. The paperboard product P is then drawn through a series of heating (drying) rolls 35 which quickly elevate the temperature of the product to point where it is dried. The paperboard product is then rolled onto a drum 36 for subsequent use.

Details relating to the invention and to manners of making and using the invention will be more fully appreciated by reference to the following illustrative examples.

EXAMPLE I

The ply comprising the paperboard product of this Example consists essentially of two layers (layers 1 and 2, FIG. 1) which include mixtures or blends of hydrophilic polyolefin and wood pulp fibers. The polyolefin included in both layers was a commercially available polyolefin sold under the tradename PULPEX ECP by Hercules Products Incorporated. PULPEX PCT has a specific gravity of about 0.905 gms per cc and a fusion temperature of about 165° C. The wood pulp fiber included in the first layer was a commercially available wood fiber sold by I.T.T. Rayonier under the tradename GEORGIANER J. It is a long fiber, high tear strength wood pulp which is commonly used in kraft paper and is known for good formation, stiffness, strength and surface characteristics. It is an absorbent pulp, manufactured from southern U.S. pine and has a weighted average fiber length of about 2.60 mm and a fiber length between about 2 and 5 mm.

The second layer included a mixture of PULPEX ECP and a commercially available wood pulp sold by Western Pulp Corporation under the tradename ALICELL. It is a bleached sulfite pulp product which is known for its high bulk and is formed from western hemlock pine.

The layers were prepared by dispersing the polyethylene and wood pulp fiber in water according to conventional paper making techniques and procedures to provide a furnish having between about 5 and 7 weight percent solids and from about 93 to 95 weight percent water. In preparing the first layer, the percent by weight solids included about 30 percent by weight polyethylene and 70 percent by weight wood pulp fiber. For preparation of the second layer, the percent by weight solids included about 60 percent by weight polyethylene and about 40 percent by weight wood pulp fiber. The two layers were wet laid using conventional Fourdrinier equipment and procedures and were pressed together by passing the layers between platens at a temperature of about 310° F. and a pressure of about 500 psi.

EXAMPLE II

In this case, a two-ply material is formed during the manufacturing process (rather than laminating the finished product). The first layer of one of the plies was thus made in laboratory equipment by mixing 850 ml. of tap water with 4.0 gm. of GEORGIANER J., 1.5 gm. of PULPEX ECP and 10 drops of 10% CARTASOL Blue E-RL liquid (dye). The furnish was dispersed on the wires of an 8 by 8 in. handsheet mold at a setting of 8 for 1 minute. The second layer of the first ply, that is the polyethylene rich layer, was made by dispersing 20 gm. of ALICELL and 25 gm. of PULPEX ECP in 3 L of water. The furnish was dispersed at a low speed for 1 minute and one first ply thus joined. The first ply was then removed from the mold without applying a vacuum. In the same mold, the second ply was similarly formed and not vacuumed. The handsheet mold was then opened and the first ply was laid squarely onto the second ply. The edges of the handsheet mold were then sealed. The two-ply sheet was then removed from the wires and lightly wet-pressed between felts. The sheet was then dried at 230° F. and consolidated between pre-heated platens (350° F.) of a press. The platens were closed and brought to 500 psi. They were held for 45 seconds and the sheet was then removed from the press.

It is apparent that modifications and changes may be made within the spirit and scope of the present invention but it is my intention, however, only to limited by the scope of the appended claims.

As my invention, I claim:

1. A paperboard product comprising:
   a first wet laid layer formed from a slurried mixture of polyolefin fibers and long fiber softwood pulp, the quantity of polyolefin fiber being less than the quantity of wood pulp fiber in the mixture, and
   a second wet laid layer formed from a slurried mixture of a polyolefin fiber and a long fiber softwood pulp, the quantity of polyolefin fiber being greater than the quantity of wood pulp;
   said wet laid layers being superimposed on one another and being bonded together by melting the polyolefin of one layer into the polyolefin and the fiber matrix in the adjacent layer.

2. The product according to claim 1 wherein the fibrils of the polyolefin have an average length between about 0.6 and 1.2 mm. and a maximum length of about 2.5 mm.

3. The product according to claim 2 wherein the polyolefin comprises polyethylene.

4. The product according to claim 2 wherein the fibers of wood pulp have a length between about 2 and 5 mm.

5. The product according to claim 2 wherein the polyolefin content in the first wet laid layer is between about 10 and 40 wt. %.

6. The product according to claim 2 wherein the polyolefin in the second wet laid layer is between about 15 and 80 wt. %.

7. A sheet material for use in the manufacture of shoe insoles having a forepart portion and heel seat and shank portion, said sheet material having at least two opposing edges, said material being a laminated paperboard product comprising:
   a first and a second ply, each ply comprising a first wet laid layer formed from a slurried mixture of polyolefin fibers and long fiber softwood pulp, the quantity of polyolefin fiber being less than the quantity of wood pulp fiber and a second wet laid layer formed from a slurried mixture of polyolefin fibers and long fiber softwood pulp, the quantity of polyolefin fiber being greater than the quantity of wood pulp;
   said plies being arranged in partial overlapping relationship with the high polyolefin layers providing surface contact and being bonded together by melting the polyolefin of the wet laid layers so that they merge and flow into the fiber matrix of the adjacent layer and compressing the plies, wherein the first ply is narrow in relation to the second ply so that in the region of overlap, the plies are more compressed whereby to provide a die-cuttable sheet material in which the physical characteristics of rigidity and flexibility are different in the areas provided by the two plies than those provided by only one ply.

8. The sheet material according to claim 7 wherein the thickness thereof is substantially uniform throughout.

9. The sheet material according to claim 7 wherein the fibrils of the polyolefin have an average length between about 0.6 and 1.2 mm. and a maximum length of about 2.5 mm.

10. The sheet material according to claim 7 wherein the polyolefin comprises polyethylene.

11. The sheet material according to claim 7 wherein the fibers of wood pulp have a length between about 2 and 5 mm.

12. The sheet material according to claim 7 wherein the polyolefin in the first and fourth layers is between about 10 and 40 wt. %.

13. The sheet material according to claim 7 wherein the polyolefin in the second and third layers is between about 15 and 80 wt. %.

14. The sheet material according to claim 7 wherein the density in one area of the product is between about 0.4 and 0.5 gm./cm³ and the density in another area is between about 0.8 and 0.95 gm./cm³.

15. A sheet material for use in the manufacture of shoe insoles having a forepart portion and a heel seat and shank portion, comprising:
   a first and a second ply, each ply comprising a first wet laid layer formed from a slurried mixture of polyolefin fibers and long fiber softwood pulp, the quantity of polyolefin fiber being less than the quantity of wood pulp fiber (the low polyolefin layer) and a second wet laid layer formed from a slurried mixture of polyolefin fibers and long fiber softwood pulp, the quantity of polyolefin fiber being greater than the quantity of wood pulp (the high polyolefin layer);
   the plies being arranged in overlapping relationship with the high polyolefin layers thereof in surface contact and being bonded together by compressing the plies and melting the polyolefin of the layers so that they merge and flow into the fiber matrix of adjacent layers thus forming face and obverse sides of the material.

16. A laminated paperboard product comprising:
   a first and a second ply, each ply comprising a first wet laid layer formed from a slurried mixture of polyolefin fibers and long fiber softwood pulp, the quantity of polyolefin fiber being less than the quantity of wood pulp fiber in the mixture, and a second wet laid layer formed from a slurried mixture of a polyolefin fiber and a long fiber softwood pulp, the quantity of polyolefin fiber being greater than the quantity of wood pulp (the high polyolefin layer);
   the plies being arranged in overlapping relationship with the high polyolefin layers thereof in surface contact with each other and being bonded together by compressing the plies and melting the polyolefin of the layers so that they merge and flow into the fiber matrix of abutting layers, thus forming face and obverse sides of the product.

17. The product according to claim 16 wherein the density in one area of the product is between about 0.4 and 0.5 gm.cm³ and the density in another area is between about 0.9 and 0.95 gm./cm³.

18. The product according to claim 16 wherein the fibrils of the polyolefin have an average length between about 0.6 and 1.2 mm. and a maximum length of about 2.5 mm.

19. The product according to claim 16 wherein the polyolefin comprises polyethylene.

20. The product according to claim 16 wherein the fibers of wood pulp have a length between about 2 and 5 mm.

21. The product according to claim 16 wherein the polyolefin in the first and fourth layers is between about 10 and 40 wt. % and the polyolefin in the second and third layers is between about 15 and 80 wt. %.

* * * * *